(12) United States Patent
Fujiwara

(10) Patent No.: US 7,706,974 B2
(45) Date of Patent: Apr. 27, 2010

(54) NAVIGATION DEVICE AND ROUTE GUIDE METHOD

(75) Inventor: Kiyozumi Fujiwara, Yokohama (JP)

(73) Assignee: Alpine Electronics, Inc., Tokyo (JP)

( * ) Notice: Subject to any disclaimer, the term of this patent is extended or adjusted under 35 U.S.C. 154(b) by 316 days.

(21) Appl. No.: 11/782,464

(22) Filed: Jul. 24, 2007

(65) Prior Publication Data
US 2008/0027641 A1    Jan. 31, 2008

(30) Foreign Application Priority Data
Jul. 27, 2006    (JP)    ............... 2006-204419

(51) Int. Cl.
*G01C 21/30* (2006.01)
(52) U.S. Cl. .................... 701/209; 701/211
(58) Field of Classification Search ............ 701/209, 701/211
See application file for complete search history.

(56) References Cited

U.S. PATENT DOCUMENTS

| | | | | |
|---|---|---|---|---|
| 5,951,621 | A * | 9/1999 | Palalau et al. ............ | 340/995.2 |
| 6,151,552 | A * | 11/2000 | Koizumi et al. ............ | 701/211 |
| 6,430,501 | B1 * | 8/2002 | Slominski ............ | 701/209 |
| 6,529,822 | B1 * | 3/2003 | Millington et al. ......... | 701/206 |
| 6,934,627 | B2 * | 8/2005 | Kawakami et al. ......... | 701/210 |
| 2001/0037176 | A1 * | 11/2001 | Mikame ............ | 701/211 |

FOREIGN PATENT DOCUMENTS

| | | |
|---|---|---|
| JP | 2003-083761 | 3/2003 |
| JP | 2006-010495 | 1/2006 |
| JP | 2006-170703 | 6/2006 |

* cited by examiner

*Primary Examiner*—Mark Hellner
(74) *Attorney, Agent, or Firm*—Brinks Hofer Gilson & Lione

(57) ABSTRACT

The invention provides a navigation device that displays a map image representing a map and a recommended route graphic representing a recommended route from a current location to a destination on the map image. The navigation device includes a self intersecting place detection unit that detects a place where the recommended route intersects itself as a self intersecting place, and a recommended route plotting unit that plots the recommended route graphic on the map image so as to display part of the recommended route graphic corresponding to an interval to be passed next through the self intersecting place, and parts of the recommended route graphic corresponding to the intervals passing through the self intersecting place other than the interval to be passed next, in different display modes. Thus, it is possible to display the recommended route on the map so that the user will easily recognize the correct travel path at the self intersecting place on the recommended route.

20 Claims, 12 Drawing Sheets

FIG. 10 (a1)
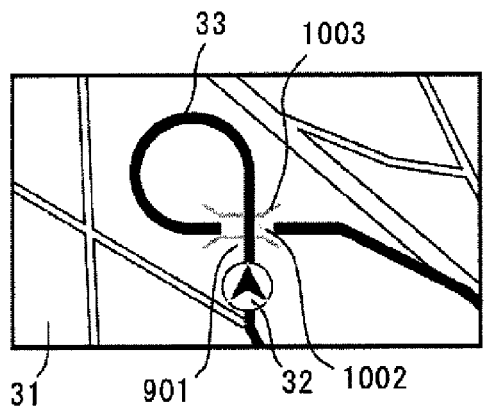
FIG. 10 (a2)
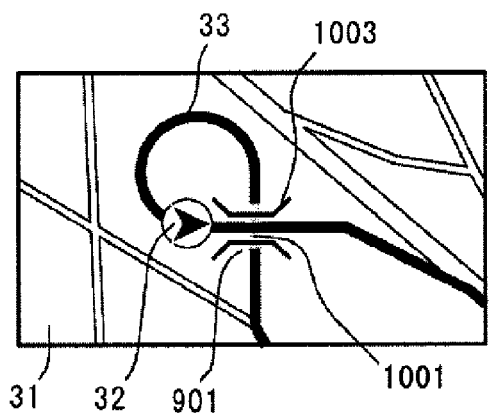
FIG. 10 (b1)
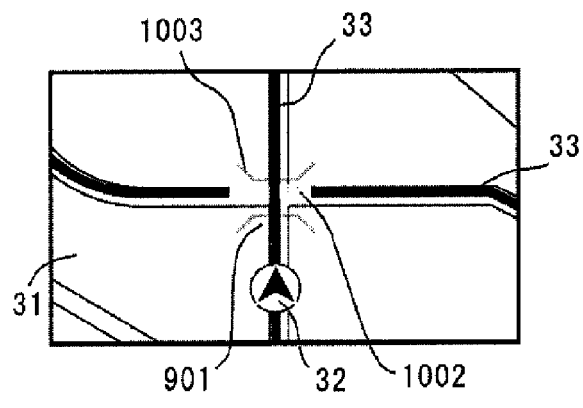
FIG. 10 (b2)
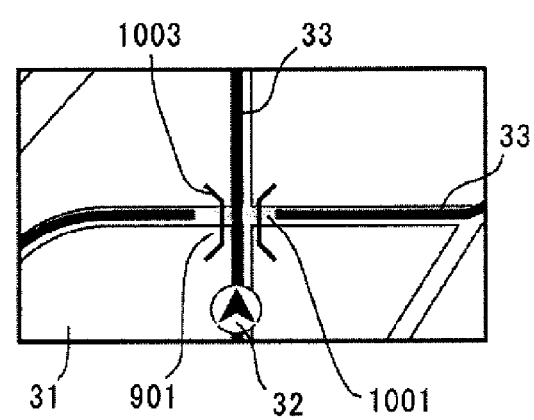
FIG. 10 (c1)
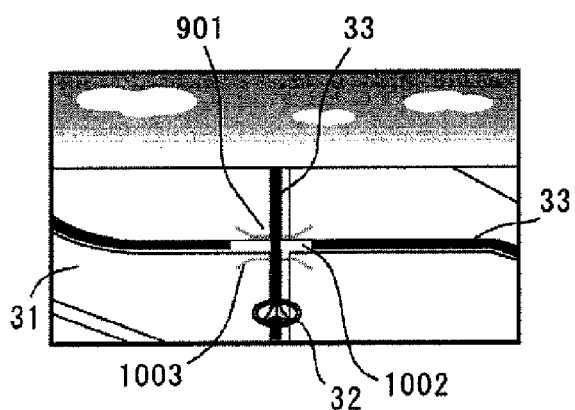
FIG. 10 (c2)
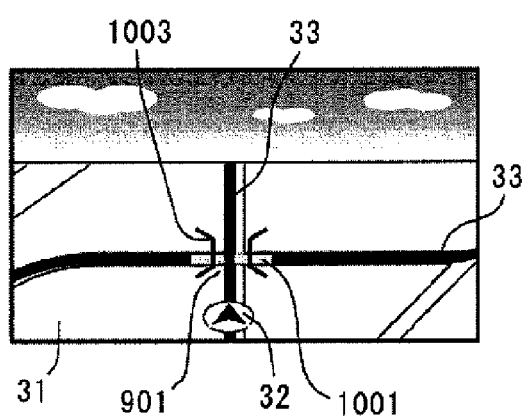

FIG. 11 (a1)    FIG. 11 (a2)
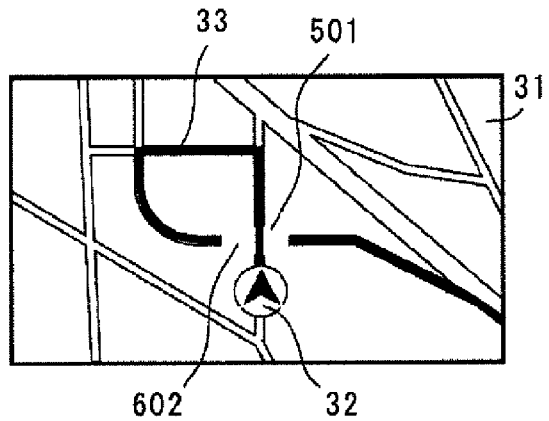 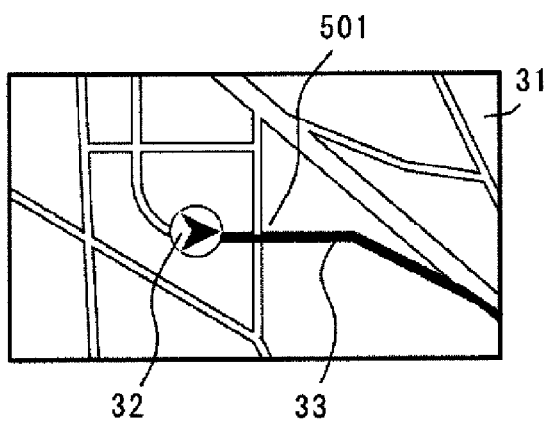
FIG. 11 (b1)    FIG. 11 (b2)
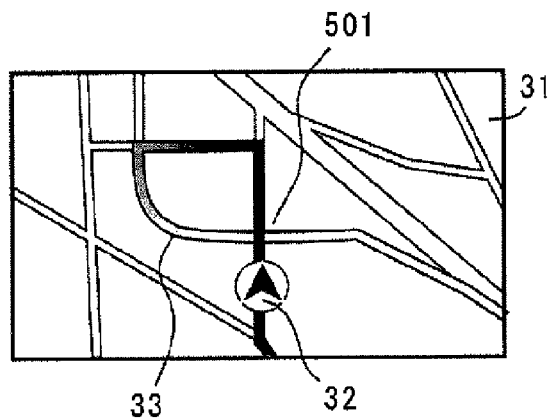 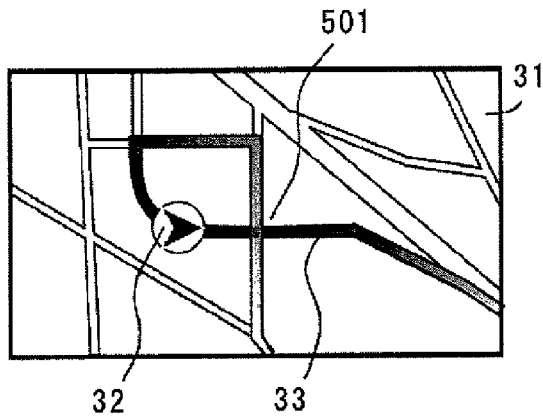
FIG. 11 (c1)    FIG. 11 (c2)
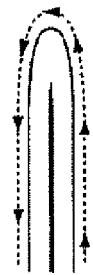 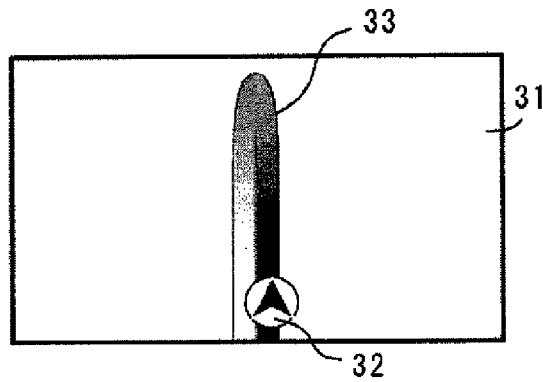

NAVIGATION DEVICE AND ROUTE GUIDE METHOD

RELATED APPLICATIONS

The present application claims priority to Japanese Patent Application Number 2006-204419, filed Jul. 27, 2006, the entirety of which is hereby incorporated by reference.

BACKGROUND OF THE INVENTION

1. Field of the Invention

The present invention relates to a navigation device that performs route guidance using a map.

2. Related Art

As a method of route guidance in a navigation device, a technique is broadly applied which accepts the setting of a destination by a user, searches for a route from a current location to the destination to set it as a recommended route, and displays, as illustrated in FIG. 12(a), a recommended route graphic 1202 representing the recommended route on a map 1201 with a range covering the current location along with a current location mark 1203 that represents the current location on the map 1201 (for example, Japanese Patent Laid-Open No. 2006-170703).

As another method of route guidance in a navigation device, a technique is well known which displays, when approaching an intersection, a map with a surrounding area of the intersection expanded, and displays on the map an arrow indicating a travel direction at the intersection along the recommended route (for example, Japanese Patent Laid-Open No. 2003-83761), and a technique is also well known which provides the travel direction at the intersection by voice (for example, Japanese Patent Laid-Open No. 2006-10495).

As illustrated with arrows in FIG. 12(b), if a route is set which passes an intersection 1211 twice in different directions as a recommended route, when the current location is just before the intersection 1211, the recommended route graphic 1202 representing the recommended route may be displayed on the map 1201 as if the recommended route were divided into three directions illustrated by the arrows in the drawing near the recommended route graphic 1202, as shown in FIG. 12(c) and FIG. 12(d). In this case, the user will have trouble understanding which direction the user should take at the intersection 1211 on the basis of the recommended route graphic 1202. Here, FIG. 12(c) shows the map at a relatively small scale, and FIG. 12(d) shows the map at a relatively large scale.

SUMMARY OF THE INVENTION

Accordingly, the present invention has been made in view of the above circumstances of the related art, and provides a method that displays a recommended route on a map so that a user can easily recognize a travel path at a place where the recommended route intersects itself.

According to one aspect of the invention, the navigation device displays a map image representing a map and a recommended route graphic representing a recommended route from a current location to a destination on the map image, and includes a self intersecting place detection unit that detects a place where the recommended route intersects itself as a self intersecting place and a recommended route plotting unit that plots the recommended route graphic on the map image so as to display part of the recommended route graphic corresponding to an interval to be passed next, of plural intervals including the self intersecting place on the recommended route, and parts of the recommended route graphic corresponding to the intervals other than the interval to be passed next, in different display modes According to this navigation device, at the place where the recommended route intersects itself, the part of the recommended route graphic corresponding to the interval to be passed next along the recommended route, of the plural intervals of the recommended route that form the self intersection, and the parts of the recommended route graphic corresponding to the intervals other than the interval to be passed next are displayed in different display modes. Accordingly, the user will be able to directly recognize the travel path to take next at the self intersecting place from the difference of the display modes in the parts of the recommended route graphic corresponding to the plural intervals that mutually intersect on the recommended route.

More specifically, in this navigation device, the recommended route plotting unit may plot the recommended route graphic on the map image so as to display the parts of the recommended route graphic corresponding to the intervals other than the interval to be passed next, of the plural intervals including the self intersecting place on the recommended route, with a lower highlighting. Thus, the parts of the recommended route graphic corresponding to the intervals other than the travel path to be taken next at the self intersecting place on the recommended route are displayed with lower highlighting, and the user will be able to find the travel path to take next at the self intersecting place intuitively from the recommended route graphic, by recognizing the parts displayed with lower highlighting as not representing the route to take next.

Alternatively, the recommended route plotting unit may plot the recommended route graphic on the map image so as to display the part of the recommended route graphic corresponding to the interval to be passed next, of the plural intervals including the self intersecting place on the recommended route, with a greater highlighting. Thus, the part of the recommended route graphic corresponding to the interval being the travel path to be taken next at the self intersecting place on the recommended route is displayed with greater highlighting, and the user will be able to find the travel path to take next at the self intersecting place intuitively from the recommended route graphic, by recognizing the part displayed with greater highlighting as representing the route to take next.

As mentioned above, the display mode of a certain part in the recommended route graphic is made differently from the display mode of the other parts, and this can be accomplished by the recommended route plotting unit plotting the relevant part with a different transparency, or with a difference of at least one of the brightness, hue, and chroma of the display color, or with a different pattern.

Alternatively, the recommended route plotting unit may plot the recommended route graphic on the map image so as to display the parts of the recommended route graphic corresponding to the intervals other than the interval to be passed next, of the plural intervals including the self intersecting place on the recommended route, with interrupted patterns at the self intersecting place. Thus, the parts of the recommended route graphic corresponding to the intervals not being the travel path to be taken next at the self intersecting place on the recommended route are displayed with interrupted patterns at the self intersecting place, and the user will thereby be able to find the travel path to take next at the self intersecting place intuitively from the recommended route graphic, by recognizing the parts displayed with interrupted patterns as not representing the route to take next.

Alternatively, the recommended route plotting unit may plot the recommended route graphic on the map image so as to display the part of the recommended route graphic corresponding to the interval to be passed next, of the plural intervals including the self intersecting place on the recommended route, with a predetermined graphic added. Thus, the part of the recommended route graphic corresponding to the interval being the travel path to be taken next at the self intersecting place on the recommended route is displayed with a graphic extending along the part, and the user will thereby be able to find the travel path to take next at the self intersecting place intuitively from the recommended route graphic, by recognizing the graphic extending along the part of the recommended route graphic as representing the direction to take next at the self intersecting place.

When the detected self intersection on the recommended route is an interchange, the recommended route plotting unit may plot the recommended route graphic on the map image so as to display the part of the recommended route graphic corresponding to the interval on the overhead side, of the plural intervals including the self intersecting place on the recommended route, with an added graphic indicating a bridge. The user will thereby be able to understand the relationship between the recommended route and the spatial structure at the self intersecting place directly from the recommended route graphic and the graphic indicating the bridge.

In another aspect, when a certain part of the recommended route graphic is displayed with a different highlighting than other parts of the recommended route graphic, as mentioned above, the recommended route plotting unit may increase the degree of difference in the highlighting as the self intersecting place detected by the self intersecting place detection unit approaches. In this case, when the certain part of the recommended route graphic is displayed with an interrupted pattern at the self intersecting place, as mentioned above, the recommended route plotting unit may increase the size of the interrupted pattern as the self intersecting place detected by the self intersecting place detection unit approaches.

According to another aspect of the invention, the navigation device displays a map image representing a map and a recommended route graphic representing a recommended route from a current location to a destination on the map image, and includes a current location calculation unit that calculates a current location and a recommended route plotting unit that plots the recommended route graphic on the map image, wherein the recommended route plotting unit varies a display color of the recommended route graphic according to a distance along the recommended route to the current location calculated by the current location calculation unit. Thus, the user will be able to recognize the route to take next at the self intersecting place directly from the difference of the display color where the recommended route graphic intersects itself.

According to another aspect of the invention, a route guide method in the navigation device displays a map image representing a map and a recommended route graphic representing a recommended route from a current location to a destination on the map image to thereby perform route guidance along the recommended route, the method including a detection act that detects a place where the recommended route intersects itself as a self intersecting place, and a plotting act that plots the recommended route graphic on the map image so as to display part of the recommended route graphic corresponding to an interval to be passed next, of plural intervals including the self intersecting place on the recommended route, and parts of the recommended route graphic corresponding to the intervals other than the interval to be passed next in different display modes.

According to this route guide method, at the place where the recommended route intersects itself the part of the recommended route graphic corresponding to the interval to be passed next along the recommended route, of plural intervals of the recommended route that form the self intersection, and the parts of the recommended route graphic corresponding to the intervals other than the interval to be passed next are displayed in different display modes. Accordingly, the user will be able to directly recognize the travel path to take next at the self intersecting place from the difference of the display modes in the parts of the recommended route graphic corresponding to the plural intervals that mutually intersect on the recommended route.

In one embodiment of the route guide method, the plotting act may plot the recommended route graphic on the map image so as to display the parts of the recommended route graphic corresponding to the intervals other than the interval to be passed next, of the plural intervals including the self intersecting place on the recommended route, with a lower highlighting. Thus, the parts of the recommended route graphic corresponding to the intervals other than the travel path to be taken next at the self intersecting place on the recommended route are displayed with lower highlighting, and the user will be able to find the travel path to take next at the self intersecting place intuitively from the recommended route graphic, by recognizing the parts displayed with lower highlighting as not representing the route to take next.

Alternatively, the plotting act may plot the recommended route graphic on the map image so as to display the parts of the recommended route graphic corresponding to the intervals other than the interval to be passed next, of the plural intervals including the self intersecting place on the recommended route, with interrupted patterns at the self intersecting place.

Alternatively, the plotting act may plot the recommended route graphic on the map image so as to display the part of the recommended route graphic corresponding to the interval to be passed next, of the plural intervals including the self intersecting place on the recommended route, with a predetermined graphic added which extends along the part. Thus, the part of the recommended route graphic corresponding to the interval being the travel path to be taken next at the self intersecting place on the recommended route is displayed with the graphic extending along the part, and the user will thereby be able to find the travel path to take next at the self intersecting place intuitively from the recommended route graphic, by recognizing the graphic extending along the part as representing the direction to take next.

Thus, according to the present invention, it is possible to display the recommended route on the map so that the user will be able to easily recognize the correct travel path at the self intersection on the recommended route.

BRIEF DESCRIPTION OF THE DRAWINGS

FIG. 10 illustrates examples of the guide image generated by the navigation device in an embodiment of the invention;

FIG. 11 illustrates examples of the guide image generated by the navigation device in an embodiment of the invention.

DESCRIPTION OF THE PREFERRED EMBODIMENTS

The preferred embodiments of the present invention will be described hereunder, with reference to the appended drawings.

Figure 1:
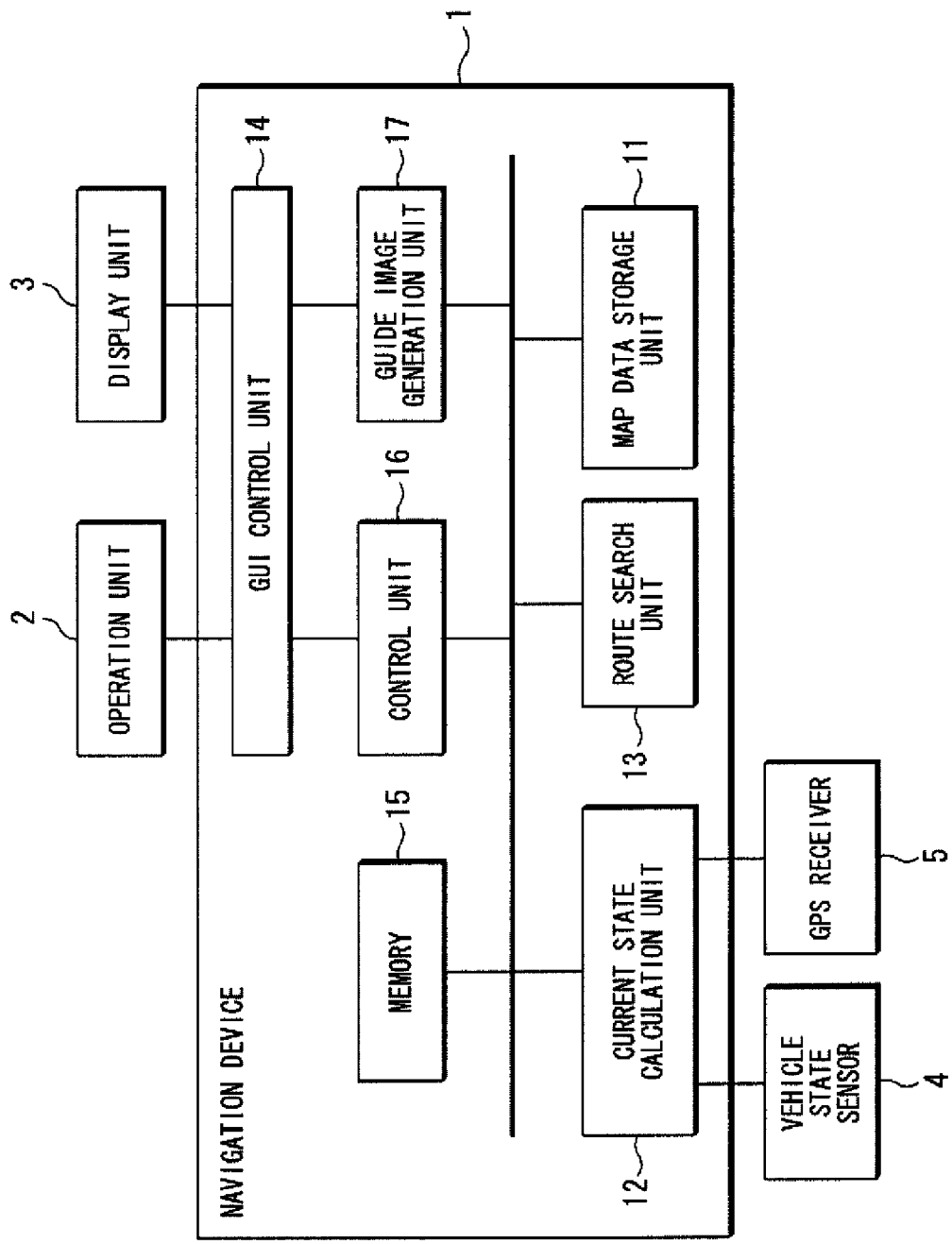
FIG. 1 is a block diagram illustrating a configuration of a navigation device relating to an embodiment of the present invention.

FIG. 1 illustrates the configuration of a navigation system relating to an embodiment. The navigation system is mounted in a vehicle and includes a navigation device 1, operation unit 2, display unit 3, vehicle state sensor 4, and GPS receiver 5, as shown in the drawing. The vehicle state sensor 4 is a set of sensors that detects the vehicle state, such as an azimuth sensor of an angular acceleration sensor, a geomagnetism sensor, etc., and a vehicle speed sensor of a vehicle pulse sensor and the like.

The navigation device 1 includes a map data storage unit 11 including a DVD drive with a mounted DVD disk, which stores map data representing maps, and a HDD that stores map data; a current state calculation unit 12, a route search unit 13, a GUI control unit 14 that provides users with a GUI (graphic user interface) using the operation unit 2 and the display unit 3, a memory 15, a control unit 16, and a guide image generation unit 17.

The above navigation device 1 may be, in terms of hardware, a device provided with a general configuration as an electronic computer composed of a microprocessor, memory, and other peripheral devices such as a graphic processor and a geometric processor, etc. In this case, the relevant parts of the above navigation device 1 may be realized as processes embodied by the microprocessor executing prepared programs. Further, such programs may be provided to the navigation device 1 through a recording medium or an appropriate data transmission channel.

Figure 2:
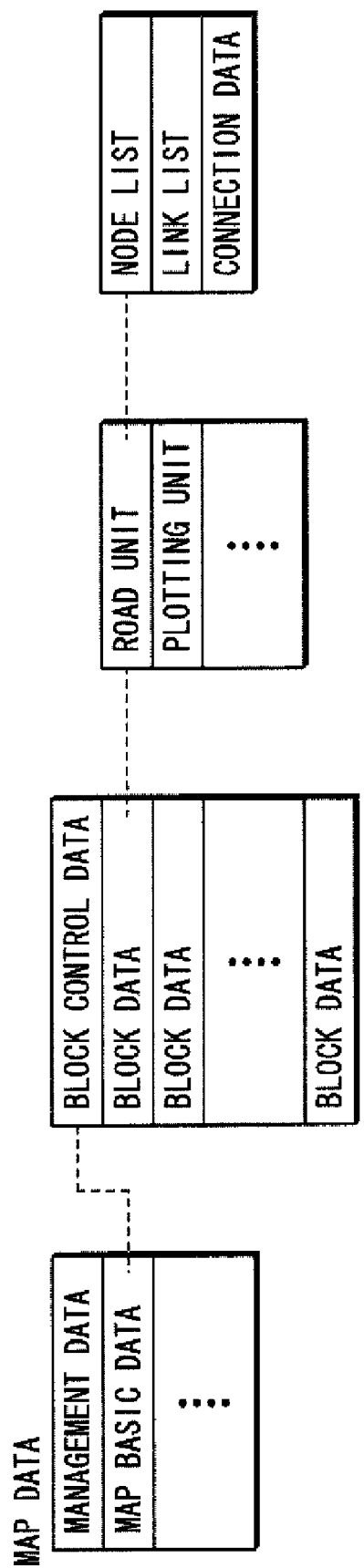
FIG. 2 is a chart illustrating the map data provided by the navigation device in an embodiment of the invention.

FIG. 2 illustrates the contents of the map data stored in the map data storage unit 11. As shown in the drawing, the map data includes management data with the creation dates or versions of the map data recorded, map basic data to plot maps, and so forth.

The map basic data includes block data corresponding to each of predetermined geographical areas, and block control data wherein the correspondence between each geographical area and each block data is recorded. Each block data includes a road unit representing a road map inside the corresponding geographical area, and a plotting unit that specifies a display map inside the corresponding geographical area.

The road unit describes a road as a set of links being straight lines, and the ends of each link are nodes. The road unit includes a node list that specifies various attributes such as coordinates of each node and so forth, a link list that specifies various attributes such as nodes being both ends of a link and so forth, and connection data that specifies the relation of each node and link with the nodes and links of the adjoining geographical areas.

The plotting unit specifies display elements of a map, such as a topographic map, road graphic, building graphic, character strings displayed on the map, such as a building name, road name, intersection name, etc, and icons being marks for displaying the presence of establishments on the map, and so forth.

With this configuration, the current state calculation unit 12 of the navigation device 1 performs the following processing repeatedly. Specifically, the current state calculation unit 12 applies to a current location estimated by the output from the vehicle state sensor 4 and the GPS receiver 5, a map matching processing with the surrounding road map at the current location previously determined, indicated by the road units of the map data read out from the map data storage unit 11, and determines the coordinates most likely as the current location and the direction most likely as the current direction of travel as the current location and the current direction of travel, respectively, and stores them in the memory 15.

The control unit 16 accepts, in response to a request for setting a destination from a user, the setting of a destination through the operation unit 2 and the GUI control unit 14, and stores it in the memory 15. After, accepting the setting of the destination, the control unit 16 controls the route search unit 13 to search for a recommended route to the destination. The route search unit 13 reads out the road units representing the road map, covering a necessary geographical range, from the map data storage unit 11, and calculates a route of minimum cost from the current location to the destination as the recommended route, on the basis of a predetermined cost model such as the minimum distance or the like, and stores the calculated recommended route in the memory 15. The control unit 16 also performs the processing that determines the arrival at the destination if the current location comes near the destination, and clears the destination and recommended route stored in the memory 15.

Further, the control unit 16 repeatedly performs the following process of generating guide images. First, the control unit 16 adopts the current location stored in the memory 15 as a reference location. Then, the control unit 16 determines the azimuth of the map display so that a preset azimuth such as the current azimuth of travel stored in the memory 15 or the north is at the upper part of the map image, determines a map scale in response to a user setting or an initial setting that has been made in advance, and determines a predetermined size of geographical range around the reference location as the map display range, in response to the determined azimuth of map display and the determined map scale.

Then, the control unit 16 instructs the guide image generation unit 17 to plot a map image representing a map, so that the azimuth of the map display in the determined map display range is at the upper part. Receiving the instruction to plot the map image from the control unit 16, the guide image generation unit 17 generates an image representing the map wherein the azimuth of the map display in the map display range is at the upper part, as a map image, on the basis of the plotting units and road units of the block data of the blocks including the regions in the map display range of the map data. When the current location stored in the memory 15 is included in the map display range, the guide image generation unit 17 plots a current location mark representing the current location at a position corresponding to the current location on the map image, in a manner that the current location mark points to the current azimuth of travel stored in the memory 15. Further, when the recommended route is stored in the memory 15, the guide image generation unit 17 performs a recommended route graphic plotting processing, and plots a recommended route graphic representing the recommended route in the determined map display range on the map image. The recommended route graphic plotting processing will be described later. Further, when the destination stored in the memory 15 is included in the map display range, the guide image generation unit 17 plots a destination mark representing the position of the destination on the map image. After performing the plotting processing of the above map image, current location mark, recommended route graphic, and destination mark, etc, the guide image generation unit 17 transmits the generated guide images to the display unit 3 through the GUI control unit 14.

FIG. 3(*a*) illustrates an example of a guide image thus displayed, and the guide image includes a current location mark 32 and a recommended route graphic 33 and so forth, which are displayed on a map image 31. However, the guide image may be made such that the map image 31 shows a bird's-eye view of the map, as illustrated in FIG. 3(*b*). As mentioned above, the guide image generation unit 17 performs the recommended route graphic plotting processing for plotting the recommended route graphic 33, which will be described hereunder.

Figure 4:
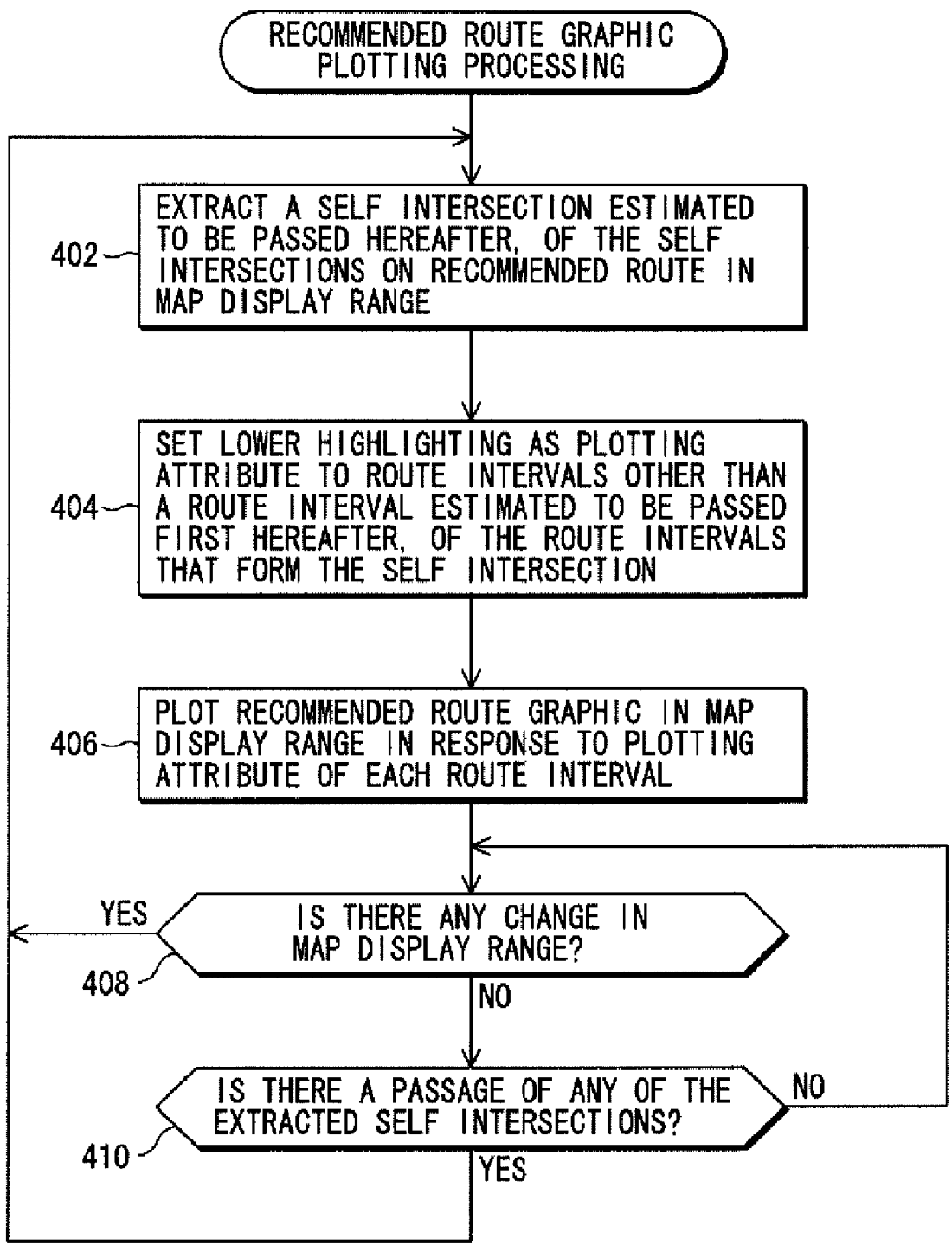
FIG. 4 is a flow chart illustrating the recommended route graphic plotting processing in an embodiment of the invention.

FIG. 4 explains the recommended route graphic plotting processing. In this processing, step 402 extracts, on the basis of the recommended route stored in the memory 15, a self intersecting part estimated to be passed hereafter, from the self intersecting parts on the recommended route in the map display range set by the control unit 16. When the recommended route passes the same intersecting point (intersection or interchange) on the road multiple times, so as to intersect itself, the intersecting point on the road is taken to be a self intersecting part. As illustrated by arrows in FIG. 5(*a*), for example, if a recommended route is set to pass an intersection 501 twice, this intersection 501 is a self intersecting part. Further, a self intersecting part estimated to be passed hereafter includes a self intersecting part to be passed at least once hereafter in traveling along the recommended route, in case it already has been passed.

If the self intersecting part is extracted in this manner, for each of the self intersecting parts extracted step 404 performs processing that sets a lower highlighting as a plotting attribute to route intervals other than a route interval estimated to be passed next, of the route intervals that form the self intersecting part. Here, an interval of a predetermined length D with the self intersecting part on the recommended route as the middle point is a route interval that forms a portion of the self intersecting part, and the intersections of these route intervals form the self intersecting parts of the recommended route. In other words, in traveling along the recommended route, if there are multiple (n) passages at a certain self intersecting part, there exist n route intervals in total, one for each of the n passages. Here, the route interval at the passage of the self intersecting part at the i-th time is the interval of a distance D formed by joining an interval of distance D/2 traveled immediately before passing the self intersecting point at the i-th time and the interval of a distance D/2 traveled right after passing the self intersecting point at the i-th time. Accordingly, if the recommended route is set to pass the intersection 501 twice, as shown by the arrows in FIG. 5(*a*), two route intervals 511, 512 will be assigned to the self intersecting part of this intersection 501, as shown in FIG. 5(*b*).

Returning to FIG. 4, in the recommended route graphic plotting processing, step 406 plots the recommended route graphic 33 representing the recommended route on the map image 31. For the part of the recommended route graphic 33 corresponding to the route interval for which a plotting attribute is set to a lower highlighting by step 404, step 406 performs the plotting of this part of the recommended route graphic 33 with a weakened tone compared to the other parts. Specifically, step 406 plots the route interval for which a plotting attribute is set to the lower highlighting by step 404 with a pale color compared to the other parts, or with a reduced brightness compared to the other parts, or with an increased transparency compared to the other parts.

Figure 5B:
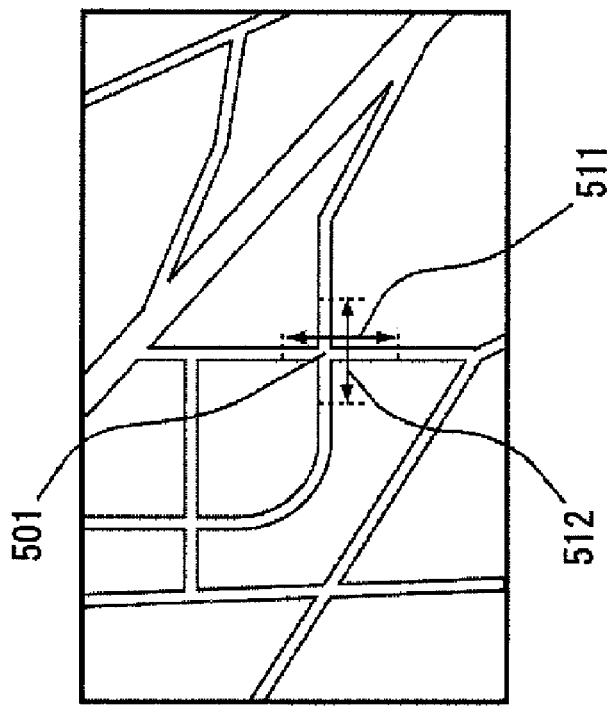
FIG. 5 illustrates examples of the guide image generated by the navigation device in an embodiment of the invention.
Figure 5A:
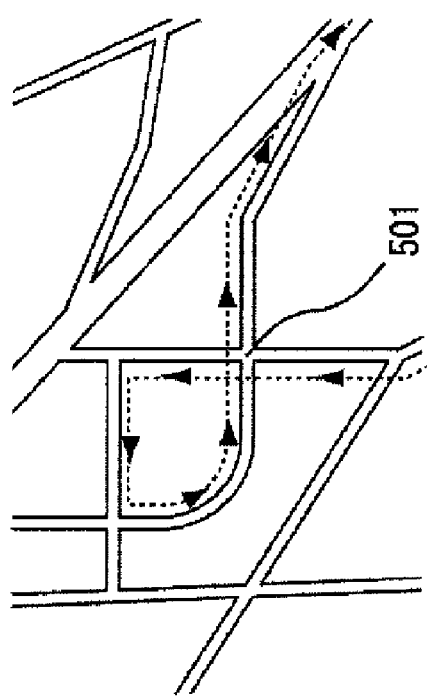
Figure 6:
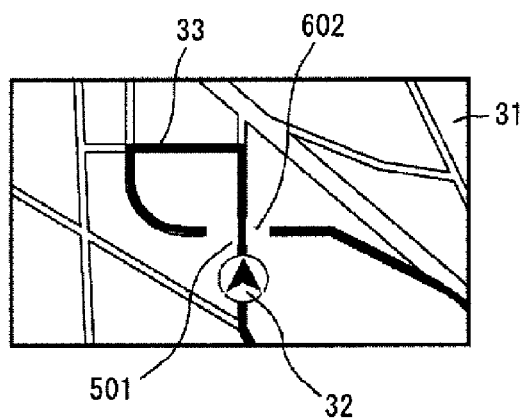
FIG. 6 illustrates examples of the guide image generated by the navigation device in an embodiment of the invention.
Figure 6:
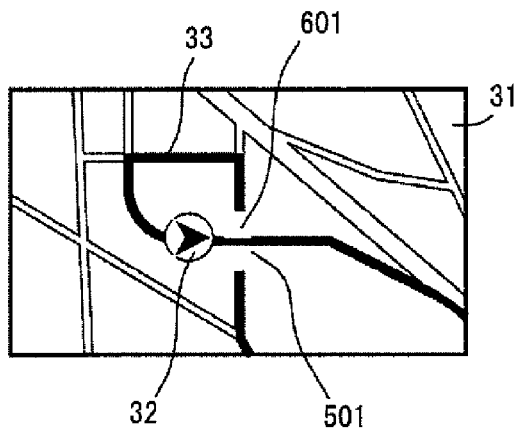
Figure 6:
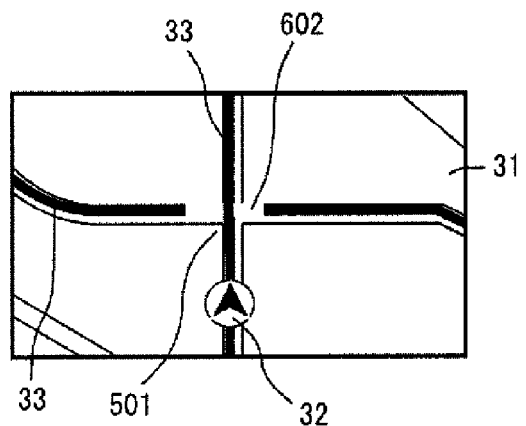
Figure 6:
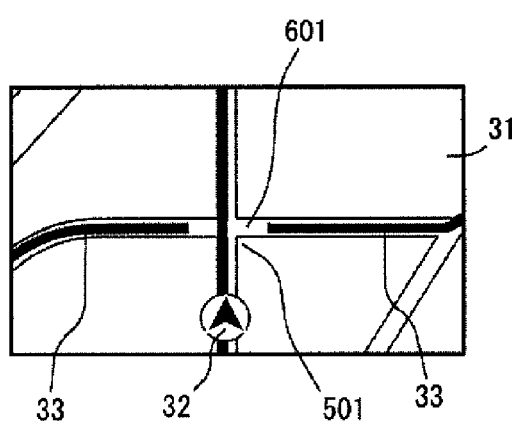
Figure 6:
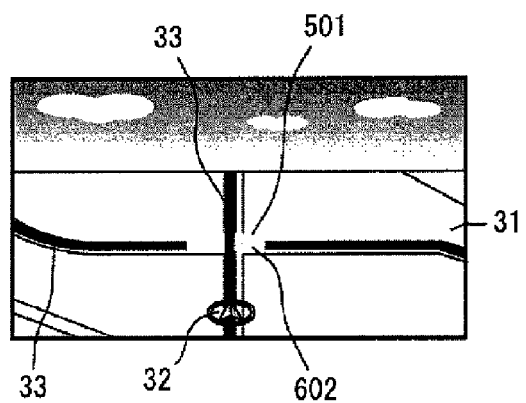
Figure 6:
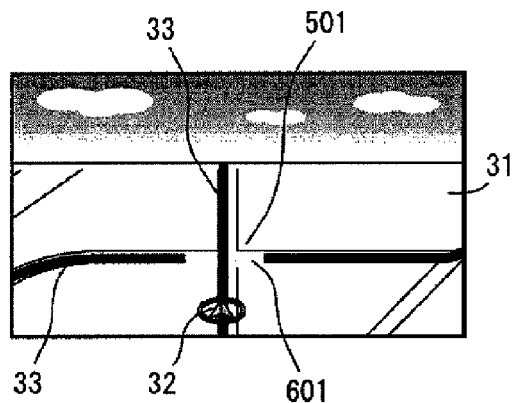

Consequently, if a recommended route is set to pass the intersection 501 twice as shown by the arrows in FIG. 5(*a*), the guide image before passing the intersection 501 the first time is displayed with a weakened tone at a part 602 representing an interval used for passing the intersection 501 of the recommended route graphic 33 the second time, as shown in FIG. 6(*a*1), FIG. 6(*b*1), and FIG. 6(*c*1). Here, FIG. 6(*b*1) shows the guide image with a smaller reduction scale than FIG. 6(*a*1); and FIG. 6(*c*1) shows the guide image with a bird's-eye view display of the map image 31. Further, the azimuth of the map display in the guide image of FIG. 6(*a*1) is fixed to the north; the azimuth of the map display in the guide images of FIG. 6(*b*1) and FIG. 6(*c*1) is set to the current azimuth of travel.

Returning to FIG. 4, when the recommended route graphic 33 is plotted as described above, step 408 monitors whether there has occurred a change in the map display range, and step 410 monitors whether there has occurred a passage in any of the self intersecting parts extracted by the step 402 at the current location; and if either situation occurs, the process returns to step 402 and plots the recommended route graphic 33 again. Accordingly, on completing the passage of the intersection 501 the first time (step 410), the recommended route graphic 33 is again plotted, and before passing the intersection 501 the second time, the guide image is displayed such that a part 601 representing an interval used for passing the intersection 501 of the recommended route graphic 33 the first time is shown with a weakened tone, as illustrated in FIG. 6(*a*2), FIG. 6(*b*2), and FIG. 6(*c*2). Here, FIG. 6(*b*2) shows the guide image with a smaller reduction scale than FIG. 6(*a*2), and FIG. 6(*c*2) shows the guide image with a bird's-eye view display of the map image 31. Further, the azimuth of the map display in the guide image of FIG. 6(*a*2) is fixed to the north; the azimuth of the map display in the guide images of FIG. 6(*b*2) and FIG. 6(*c*2) is set to the current azimuth of travel.

Because the guide image is displayed as described above, when passing the intersection 501 along the recommended route, the user is able to intuitively find it safe to pass the intersection 501 along the route not being displayed with a weakened tone on the recommended route graphic 33.

In the above recommended route graphic plotting processing, the parts of the recommended route graphic 33 corresponding to the route intervals other than the route interval estimated to be passed next, of the route intervals that form the self intersecting part, are displayed with a weakened tone; and this enables the user to recognize the route to pass next at the self intersecting part. However, this may be made inversely, that is, the part of the recommended route graphic 33 corresponding to the route interval estimated to be passed next, of the route intervals that form the self intersecting part, may be displayed with a stronger tone compared to the other parts, so that the user will be able to recognize the route to pass next at the self intersecting part.

Figure 7:
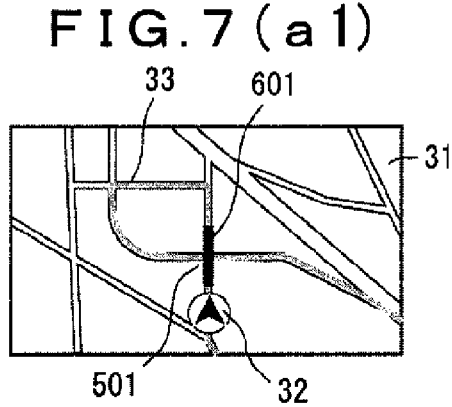
FIG. 7 illustrates examples of the guide image generated by the navigation device in an embodiment of the invention.
Figure 7:
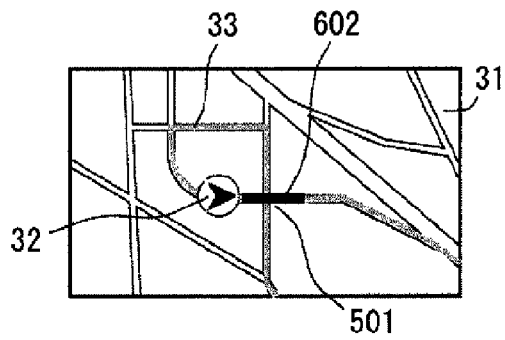
Figure 7:
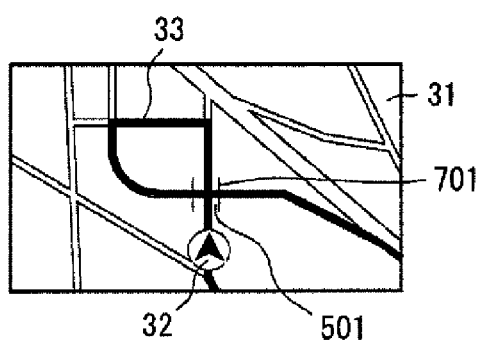
Figure 7:
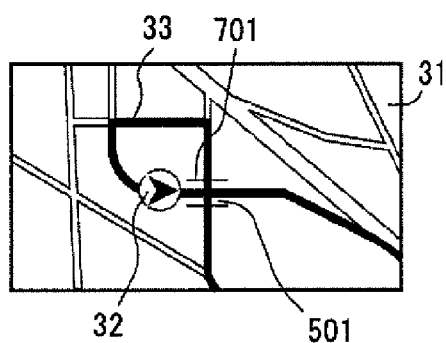
Figure 7:
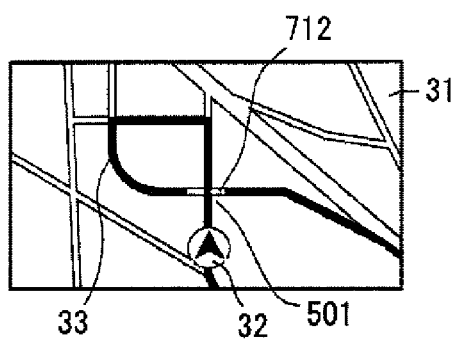
Figure 7:
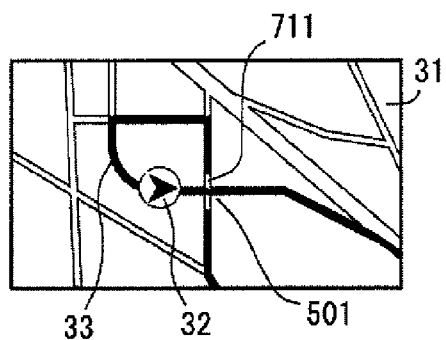
Figure 7:
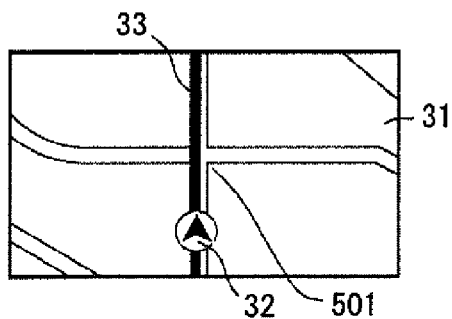
Figure 7:
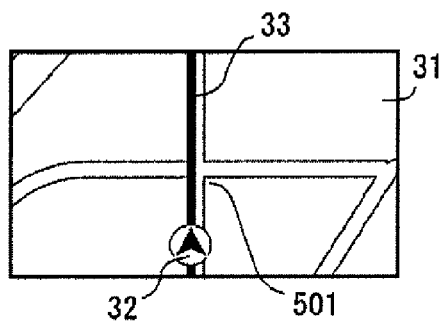

Thereby, if a recommended route is set to pass the intersection 501 twice as shown by the arrows in FIG. 5(*a*), the guide image before passing the intersection 501 the first time is displayed such that the part 601 representing an interval used for passing the intersection 501 of the recommended route graphic 33 the first time is shown with a stronger tone, as illustrated in FIG. 7(*a*1); and after passing the intersection 501 the first time, but before passing the second time, the guide image is displayed such that the part 602 representing an interval used for passing the intersection 501 of the recommended route graphic 33 the second time is shown with a stronger tone, as illustrated in FIG. 7(*a*2).

Further, in the above recommended route graphic plotting processing, the part of the recommended route graphic 33 corresponding to the route interval estimated to be passed next, of the route intervals that form the self intersecting part, may be displayed with a predetermined added graphic, and the user will thereby be able to recognize the route to pass next at the self intersecting part. As a graphic added to the part of the recommended route graphic 33, an arrow can be used for indicating a direction of travel along the recommended route of the route interval estimated to be passed next, or a graphic representing a bridge on which passes an interval corresponding to the part of the recommended route graphic 33 can be added, and so forth. Thus, in case a recommended route is set to pass the intersection 501 twice as shown by the arrows in FIG. 5(*a*), when the graphic representing a bridge is added to the part of the recommended route graphic 33, the guide image before passing the intersection 501 the first time is displayed with a graphic 701 indicating that the part representing an interval used for passing the intersection 501 of the recommended route graphic 33 the first time is an interval on a bridge, as shown in FIG. 7(*b*1); and after passing the intersection 501 the first time, but before passing the second time, the guide image is displayed with the graphic 701 indicating that the part representing an interval used for passing the intersection 501 of the recommended route graphic 33 the second time is an interval on a bridge, as shown in FIG. 7(*b*2).

Alternatively, in the above recommended route graphic plotting processing, the parts of the recommended route graphic 33 corresponding to the route intervals other than the route interval estimated to be passed next, of the route intervals that form the self intersecting part, may be not displayed; thereby, the user will be able to recognize the route to pass next at the self intersecting part. Thus, if a recommended route is set to pass the intersection 501 twice as shown by the arrows in FIG. 5(*a*), the guide image before passing the intersection 501 the first time is displayed, as shown in FIG. 7(*c*1), in such a manner that the recommended route graphic 33 is interrupted at a part 712 representing an interval used for passing the intersection 501 the second time; and after passing the intersection 501 the first time, but before passing the second time, the guide image is displayed, as shown in FIG. 7(*c*2), in such a manner that the recommended route graphic 33 is interrupted at a part 711 representing an interval used for passing the intersection 501 the first time.

Alternatively, in the above recommended route graphic plotting processing, when there exists a route interval that is not displayed continuously on the guide image along with the route interval estimated to be passed next, the guide image may be made not to display the part of the recommended route graphic 33 corresponding to the interrupted portion. Thus, the guide image as shown in FIG. 7(*d*1), for example, is displayed instead of the guide image shown in FIG. 6(*b*1); and the guide image as shown in FIG. 7(*d*2) is displayed instead of the guide image shown in FIG. 6(*b*2). Accordingly, if a recommended route is set to pass twice through the intersection 501 as shown by the arrows in FIG. 5(*a*), the guide image before passing the intersection 501 of the recommended route graphic 33 the first time does not display the part of the route graphic 33 including the interval used for passing the intersection 501 the second time, as shown in FIG. 7(*d*1). Conversely, the guide image after passing the intersection 501 the first time, but before passing the second time, does not display the part of the route graphic 33 including the interval used for passing the intersection 501 of the recommended route graphic 33 the first time, as shown in FIG. 7(*d*2).

The display processing of the route intervals that form the self intersecting part of the recommended route graphic 33 may be made only to the self intersecting part which the current location approaches. In this case, step 402 in the recommended route graphic plotting processing extracts only the self intersecting part to be passed during a next predetermined distance along the recommended route. Further, the display of the recommended route graphic 33 of the self intersecting part may be varied in response to a distance or a route distance between the current location and the self intersecting part. In the embodiment of FIG. 6, for example, where the parts of the recommended route graphic 33 corresponding to the route intervals other than the route interval estimated to be passed next are displayed with a weakened tone, the part 602 of the recommended route graphic 33 corresponding to the route intervals other than the route interval estimated to be passed next is displayed with an increasingly weakened tone as the current location approaches the intersection 501, as shown in FIG. 8(*a*1), FIG. 8(*a*2), and FIG. 8(*a*3).

Figure 8:
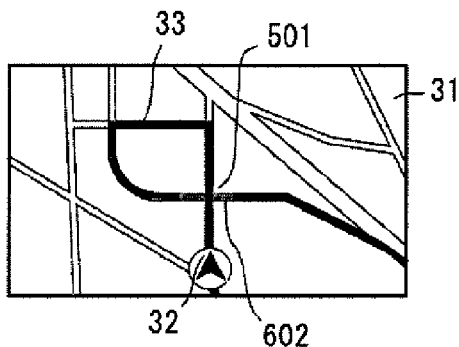
FIG. 8 illustrates examples of the guide image generated by the navigation device in an embodiment of the invention.
Figure 8:
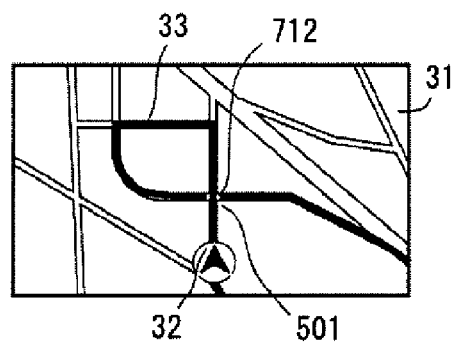
Figure 8:
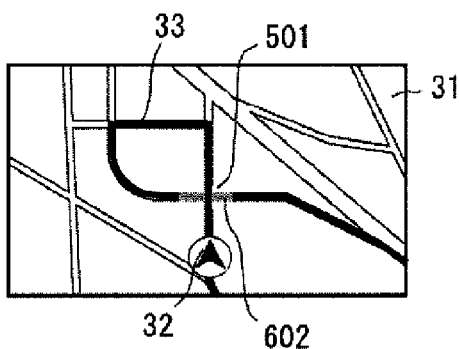
Figure 8:
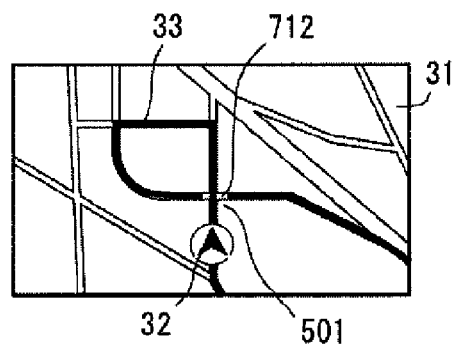
Figure 8:
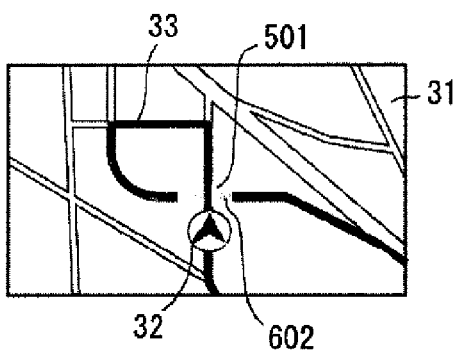
Figure 8:
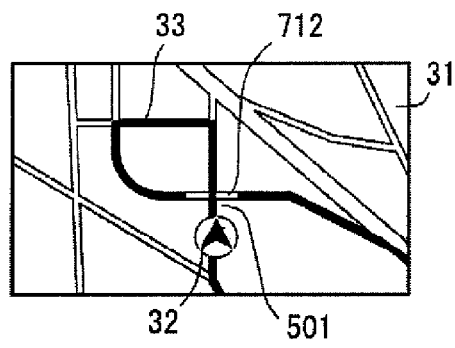
Figure 8C:
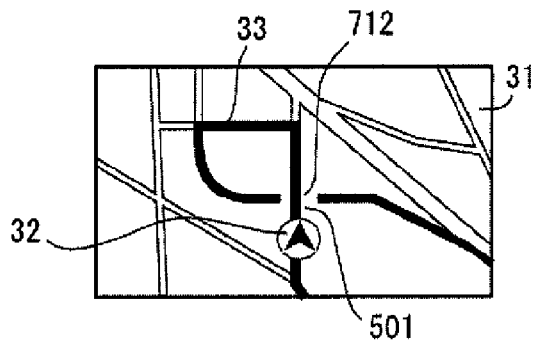

Similarly, in the embodiment of FIG. 7(*c*1) and FIG. 7(*c*2), for example, when the parts of the recommended route graphic 33 corresponding to the route intervals other than the route interval estimated to be passed next are not displayed, the part 712 not being displayed may be made longer as the current location approaches the intersection 501, as shown in FIG. 8(*b*1), FIG. 8(*b*2), and FIG. 8(*b*3). Further, when the parts of the recommended route graphic 33 corresponding to the route intervals other than the route interval estimated to be passed next are not displayed, the guide image may be made such that a road map represented by the map image 31 does not show the road section corresponding to the part 712 of the recommended route graphic 33, as shown in FIG. 8(*c*).

Figure 9C:
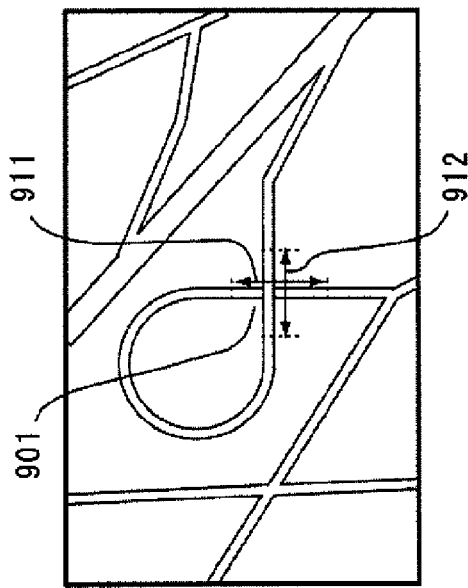
FIG. 9 illustrates examples of the guide image generated by the navigation device in an embodiment of the invention.
Figure 9A:
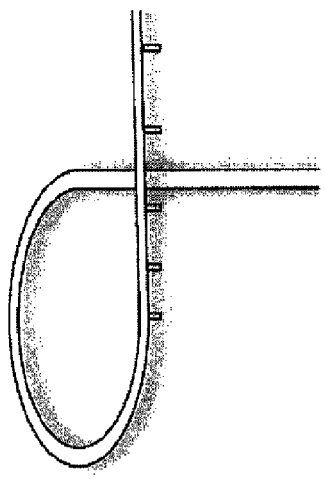
Figure 9B:
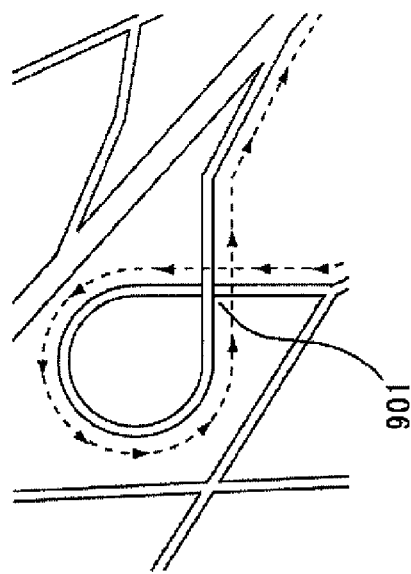
Figure 12B:
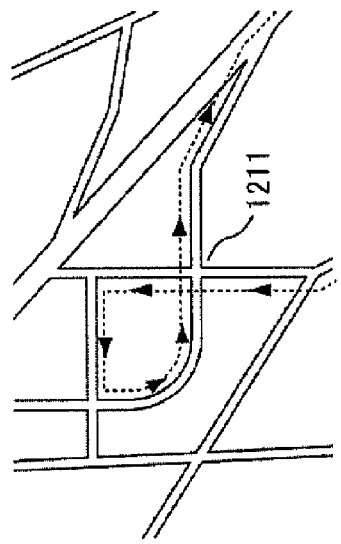
FIG. 12 illustrates examples of the display image generated by a conventional navigation device.
Figure 12A:
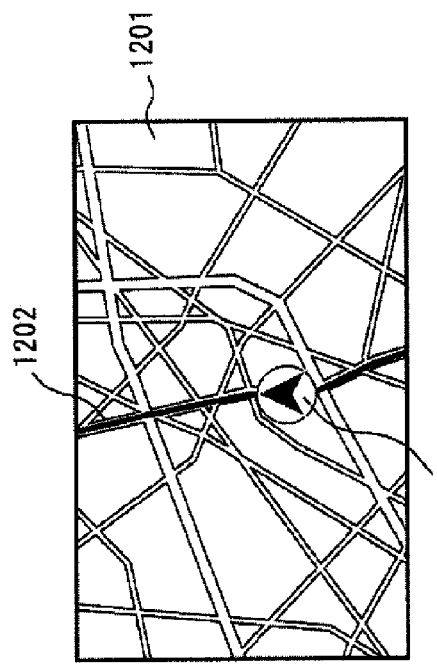
Figure 12D:
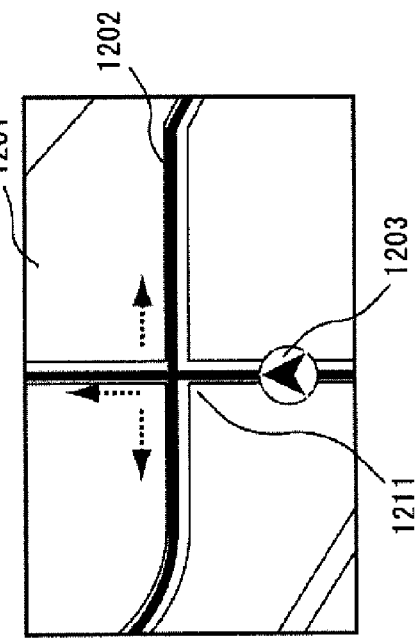
Figure 12C:
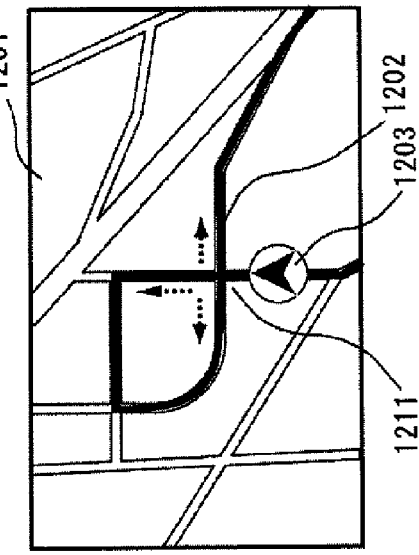

In the above embodiments, the guide image has been described on the assumption that the self intersecting part is an intersection; however, if the self intersecting part is an interchange, the guide image may be displayed as follows. Specifically, if a recommended route includes an interchange, as typically illustrated in FIG. 9(*a*) and shown by arrows in FIG. 9(*b*), an intersecting point 901 of the road at this interchange is a self intersecting part. Further, two route intervals 911, 912 at this intersecting point 901 are identified as the route intervals that form the self intersecting part, as shown in FIG. 9(*c*). Each time the plotting of the recommended route graphic 33 is performed on the route intervals other than the route interval estimated to be passed next, a lower tone is set as the plotting attribute.

Consequently, if the recommended route passes the interchange as shown by arrows in FIG. 9(*b*), the guide image before passing the intersecting point 901 the first time will be displayed such that a part 1002 representing an interval used for passing the intersecting point 901 of the recommended route graphic 33 the second time is shown with a weakened tone, as illustrated in FIG. 10(*a*1), FIG. 10(*b*1), and FIG. 10(*c*1). Then, after passing the intersecting point 901 the first time, but before passing the second time, the guide image will be displayed such that a part 1001 representing an interval used for passing the intersecting point 901 of the recommended route graphic 33 the first time is shown with a weakened tone, as illustrated in FIG. 10(*a*2), FIG. 10(*b*2), and FIG. 10(*c*2).

In the case of displaying the recommended route graphic 33 passing the intersecting point of an interchange multiple times, as shown in FIG. 10, it is preferable to add a graphic 1003 representing a land bridge to the part of the recommended route graphic 33 corresponding to the route interval on the overhead side of the route intervals that form the self intersecting part. As shown in FIG. 10(a1), FIG. 10(b1), and FIG. 10(c1), when a part 1002 of the recommended route graphic 33 having the graphic 1003 representing the land bridge added thereto is displayed with a weakened tone, the graphic 1003 is displayed with a weakened tone along with the part 1002. The determination as to which route interval is on the overhead side, of the plural route intervals that form the self intersecting part of the recommended route at the interchange, is made as follows. That is, information on the altitudes of the links or the nodes is stored in advance in the road units of the map data. From the upper and lower relationship of the route intervals as determined by the information on the altitudes, one of the route intervals is determined to be the route interval on the overhead side.

In FIG. 10, FIG. 10(b1) and FIG. 10(b2) show the guide image with a smaller scale reduction than FIG. 10(a1) and FIG. 10(a2); and FIG. 10(c1) and FIG. 10(c2) show the guide image with a bird's-eye view display of the map image 31. The azimuth of the map display in the guide image of FIG. 10(a1) and FIG. 10(a2) is fixed to the north; the azimuth of the map display in the guide image of FIG. 10(b1), FIG. 10(b2), FIG. 10(d1), and FIG. 10(c2) is set to the current azimuth of travel.

Figure 3A:
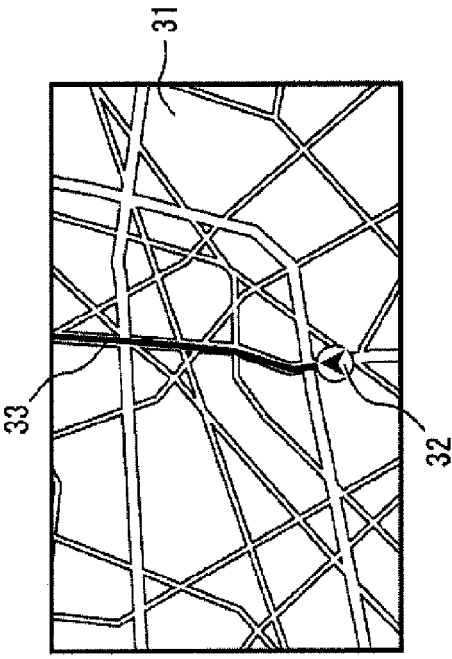
FIG. 3 is a chart illustrating examples of the display screen of the navigation device in an embodiment of the invention.
Figure 3C:
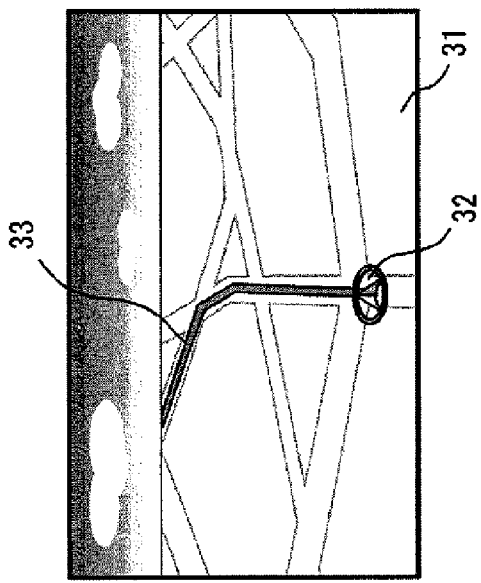
Figure 3B:
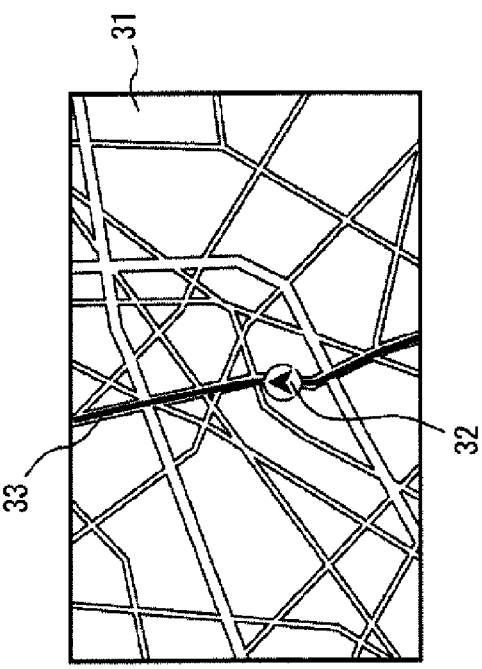
Figure 3D:
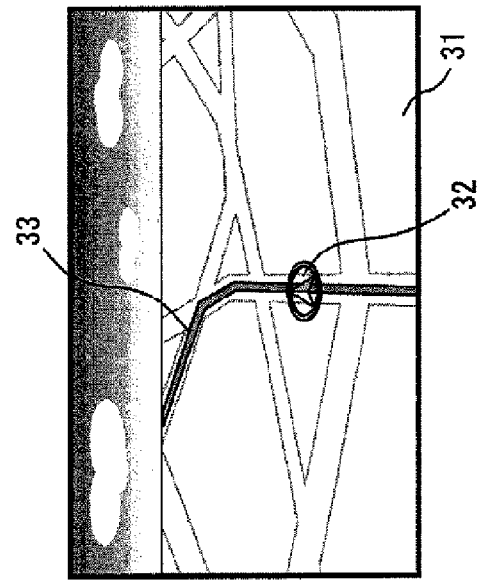

In an alternative embodiment, after setting the recommended route, the control unit 16 may exclude the part of the recommended route already passed, with movement of the current location along the recommended route, to thereby set only a route between the current location and the destination as an updated recommended route. When the recommended route is updated in this manner, the guide image is displayed on the map image 31 as shown in FIG. 3(c) and FIG. 3(d), with the recommended route graphic 33 having the current location mark 32 as a starting point. Here, FIG. 3(d) shows the guide image with a bird's-eye view display of the map image 31.

In this case, if a recommended route is set to pass the intersection 501 twice as shown by the arrows in FIG. 5(a), the guide image before passing the intersection 501 the first time is made by the recommended route graphic plotting processing illustrated in FIG. 4 such that the recommended route graphic 33 with the part 602 representing the interval used for passing the intersection 501 the second time is plotted with a weakened tone, as shown in FIG. 11(a1). Then, after passing the intersection 501 the first time, but before passing the second time, the route interval used for passing the intersection 501 the first time is excluded from the recommended route, and the self intersection of the recommended route is deleted. Therefore, the guide image is made by the recommended route graphic plotting processing such that the passed portion of the recommended route graphic 33 is plotted with a normal tone, as shown in FIG. 11(a2).

The recommended route graphic plotting processing may be made to plot the recommended route graphic 33 by providing gradations such that the hue, brightness, pattern, or chroma gradually vary as the plotting position becomes more distant from the current location. In this case, the gradations may be such that a position closer on the recommended route graphic 33 to the current location is displayed with a stronger tone. Thus, if the recommended route is set to pass the intersection 501 twice as shown by the arrows in FIG. 5(a), the guide image before passing the intersection 501 the first time is displayed as shown in FIG. 11(b1); and after passing the intersection 501 the first time, but before passing the second time, the guide image is displayed as shown in FIG. 11(b2). In both cases, the user will be able to recognize the route for passing the self intersecting part next directly from the display of the recommended route graphic 33.

When the recommended route passes closely adjacent roads as shown in FIG. 11(c1), by plotting the recommended route graphic 33 with the gradations in this manner, it is possible to make the adjacent parts of the recommended route graphic 33 be displayed distinctly, as shown in FIG. 11(c2).

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A navigation device that displays a map image representing a map and a recommended route graphic representing a recommended route from a current location to a destination on the map image, comprising:
 a self intersecting place detection unit that detects a place where the recommended route intersects itself as a self intersecting place; and
 a recommended route plotting unit that plots the recommended route graphic on the map image so as to display part of the recommended route graphic corresponding to an interval to be passed next along the recommended route, of plural intervals including the self intersecting place on the recommended route, and parts of the recommended route graphic corresponding to the intervals other than the interval to be passed next of the plural intervals, in different display modes.

2. A navigation device according to claim 1, wherein the recommended route plotting unit plots the recommended route graphic on the map image so as to display the parts of the recommended route graphic corresponding to the intervals other than the interval to be passed next with a lower highlighting than that of the interval to be passed next.

3. A navigation device according to claim 1, wherein the recommended route plotting unit plots the recommended route graphic on the map image so as to display the parts of the recommended route graphic corresponding to the intervals other than the interval to be passed next with a different transparency than that of the interval to be passed next.

4. A navigation device according to claim 1, wherein the recommended route plotting unit plots the recommended route graphic on the map image so as to display the parts of the recommended route graphic corresponding to the intervals other than the interval to be passed next with a different display color in at least one of brightness, hue, and chroma of the display color than that of the interval to be passed next.

5. A navigation device according to claim 1, wherein the recommended route plotting unit plots the recommended route graphic on the map image so as to display the parts of the recommended route graphic corresponding to the intervals other than the interval to be passed next with a different pattern than that of the interval to be passed next.

6. A navigation device according to claim 1, wherein the recommended route plotting unit plots the recommended route graphic on the map image so as to display the parts of the recommended route graphic corresponding to the intervals other than the interval to be passed next with interrupted patterns at the self intersecting place.

7. A navigation device according to claim 1, wherein the recommended route plotting unit plots the recommended route graphic on the map image so as to display the part of the recommended route graphic corresponding to the interval to be passed next with a greater highlighting than that of the other intervals.

8. A navigation device according to claim 1, wherein the recommended route plotting unit plots the recommended route graphic on the map image so as to display the part of the recommended route graphic corresponding to the interval to be passed next with a different transparency than that of the other intervals.

9. A navigation device according to claim 1, wherein the recommended route plotting unit plots the recommended route graphic on the map image so as to display the part of the recommended route graphic corresponding to the interval to be passed next with a different display color in at least one of brightness, hue, and chroma of the display color than that of the other intervals.

10. A navigation device according to claim 1, wherein the recommended route plotting unit plots the recommended route graphic on the map image so as to display the part of the recommended route graphic corresponding to the interval to be passed next with a different pattern than that of the other intervals.

11. A navigation device according to claim 1, wherein the recommended route plotting unit plots the recommended route graphic on the map image so as to display the part of the recommended route graphic corresponding to the interval to be passed next with a predetermined graphic added.

12. A navigation device according to claim 1, wherein, when the self intersection on the recommended route at the self intersecting place detected by the self intersecting place detection unit is an interchange, the recommended route plotting unit plots the recommended route graphic on the map image so as to display the part of the recommended route graphic corresponding to the interval on the overhead side, of the plural intervals including the self intersecting place on the recommended route, with a graphic indicating a bridge.

13. A navigation device according to claim 1, wherein, when approaching a place where the recommended route intersects itself more than a predetermined level, the self intersecting place detection detects the place concerned as a self intersecting place.

14. A navigation device according to claim 13, wherein the recommended route plotting unit plots the recommended route graphic on the map image so as to display the parts of the recommended route graphic corresponding to the intervals other than the interval to be passed next, of the plural intervals including the self intersecting place on the recommended route, with a predetermined highlighting level lower than that of the interval to be passed next, and varies the predetermined highlighting according to a distance from the current location to the self intersecting place.

15. A navigation device according to claim 13, wherein the recommended route plotting unit plots the recommended route graphic on the map image so as to display the parts of the recommended route graphic corresponding to the intervals other than the interval to be passed next, of the plural intervals including the self intersecting place on the recommended route, with a different display mode for a predetermined distance at the self intersecting place, and increases the predetermined distance as the current location approaches the self intersecting place.

16. A navigation device that displays a map image representing a map and a recommended route graphic representing a recommended route from a current location to a destination on the map image, comprising:

a current location calculation unit that calculates a current location; and a recommended route plotting unit that plots the recommended route graphic on the map image, wherein the recommended route plotting unit varies a display mode of the recommended route graphic according to a route distance along the recommended route from the current location on the recommended route.

17. A route guide method in a navigation device that displays a map image representing a map and a recommended route graphic representing a recommended route from a current location to a destination on the map image, to thereby perform route guidance along the recommended route, comprising:

detecting a place where the recommended route intersects itself as a self intersecting place; and plotting the recommended route graphic on the map image so as to display part of the recommended route graphic corresponding to an interval to be passed next, of plural intervals including the self intersecting place on the recommended route, and parts of the recommended route graphic corresponding to the intervals other than the interval to be passed next in different display modes.

18. A route guide method according to claim 17, wherein the plotting act plots the recommended route graphic on the map image so as to display the parts of the recommended route graphic corresponding to the intervals other than the interval to be passed next with a lower highlighting than that of the interval to be passed next.

19. A route guide method according to claim 17, wherein the plotting act plots the recommended route graphic on the map image so as to display the parts of the recommended route graphic corresponding to the intervals other than the interval to be passed next with interrupted patterns at the self intersecting place.

20. A route guide method according to claim 17, wherein the plotting act plots the recommended route graphic on the map image so as to display the part of the recommended route graphic corresponding to the interval to be passed next, of the plural intervals including the self intersecting place on the recommended route, with a predetermined graphic added.

* * * * *